US008643703B1

United States Patent
Karakotsios et al.

(10) Patent No.: US 8,643,703 B1
(45) Date of Patent: Feb. 4, 2014

(54) VIEWER TRACKING IMAGE DISPLAY

(75) Inventors: Kenneth M. Karakotsios, San Jose, CA (US); Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 490 days.

(21) Appl. No.: 13/076,322

(22) Filed: Mar. 30, 2011

(51) Int. Cl.
*H04N 13/02* (2006.01)
*G06K 9/00* (2006.01)

(52) U.S. Cl.
USPC .............................. 348/47; 382/103; 345/156

(58) Field of Classification Search
USPC .......................................................... 348/47
See application file for complete search history.

(56) References Cited

U.S. PATENT DOCUMENTS

2009/0058845 A1* 3/2009 Fukuda et al. ................ 345/214
2011/0243388 A1* 10/2011 Sakaguchi et al. ............ 382/103

* cited by examiner

*Primary Examiner* — Sath V Perungavoor
*Assistant Examiner* — Howard D Brown, Jr.
(74) *Attorney, Agent, or Firm* — Novak Druce Connolly Bove + Quigg LLP

(57) ABSTRACT

Image information displayed on an electronic device can be adjusted based at least in part upon a relative position of a viewer with respect to a device. In some embodiments, image stabilization can be provided such that an image remains substantially consistent from the point of view of the viewer, not the display element of the device. The image can be stretched, rotated, compressed, or otherwise manipulated based at least in part upon the relative viewing position. Similarly, the viewer can move relative to the device to obtain different views, but views that are consistent with the viewer looking at an object, for example, through a piece of glass. The device can overlay information on the image that will adjust with the adjusted image. Three-dimensional modeling and display can be used to offset parallax and focus point effects.

27 Claims, 9 Drawing Sheets

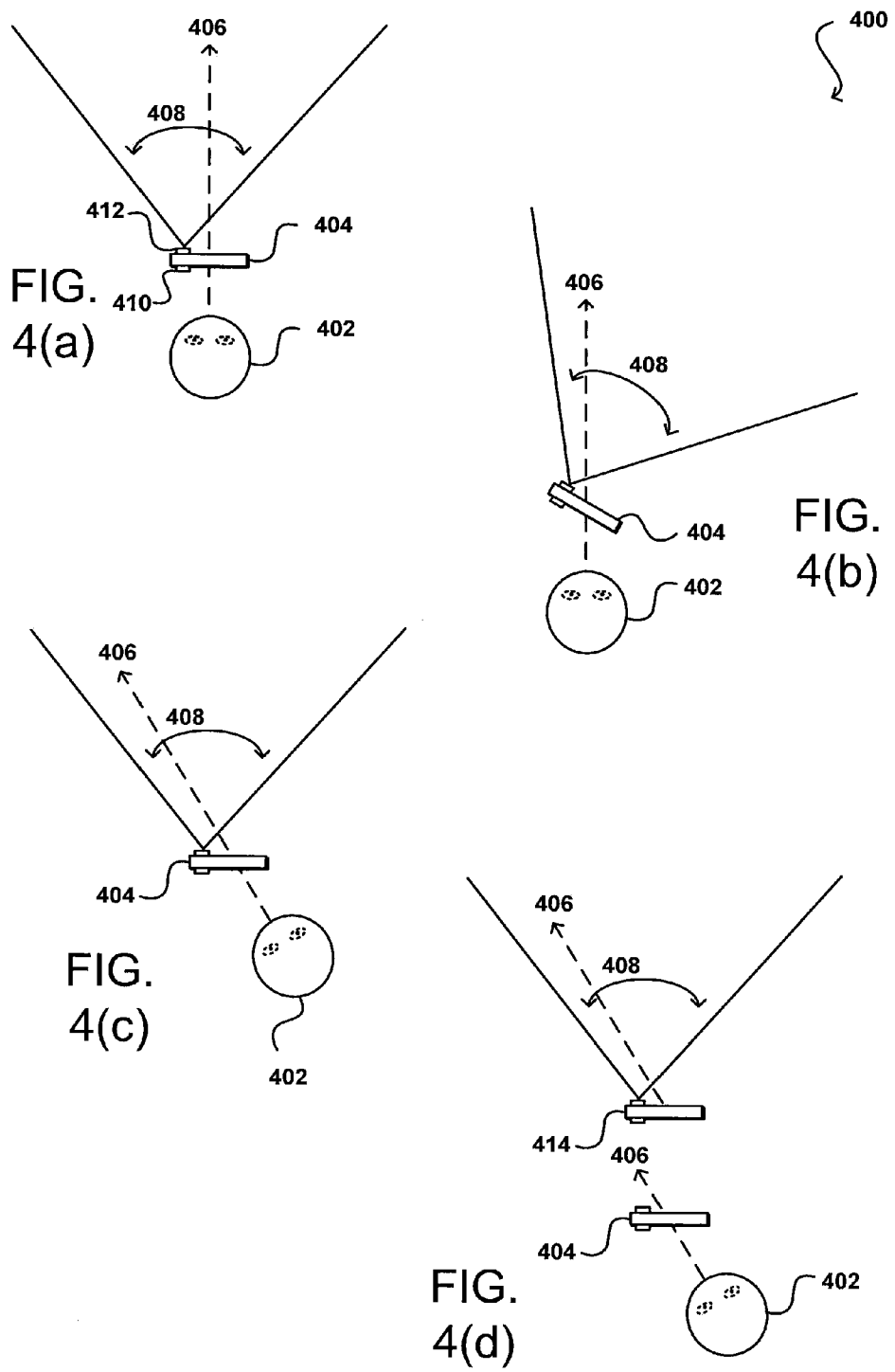

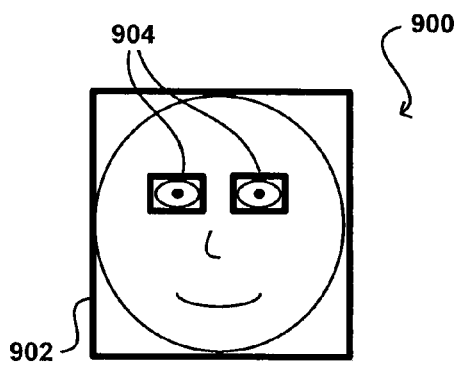
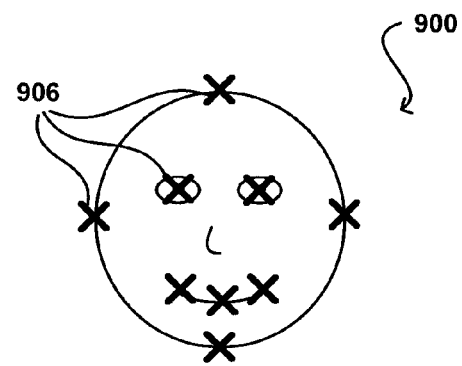
FIG. 9(a)  FIG. 9(b)
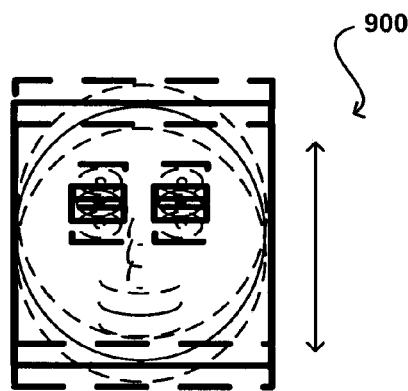
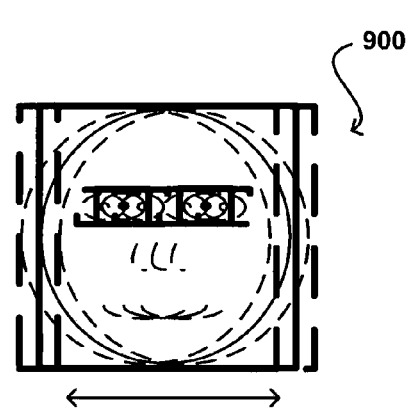
FIG. 9(c)  FIG. 9(d)

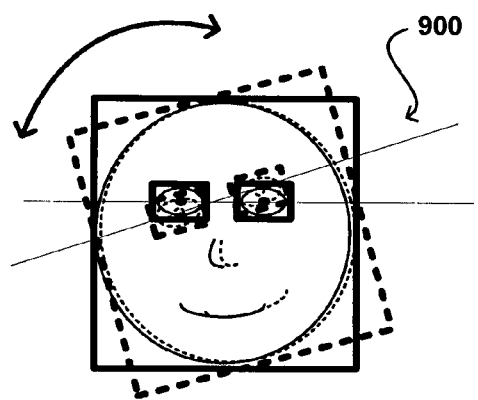
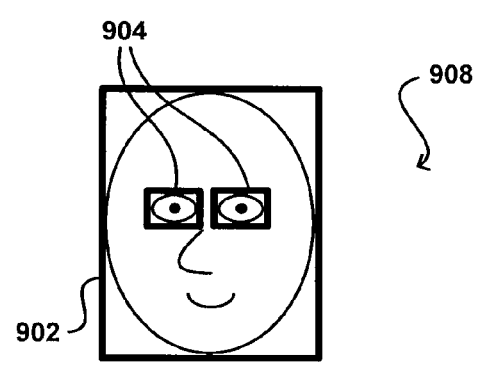
FIG. 9(e)　　　　　　　FIG. 9(f)
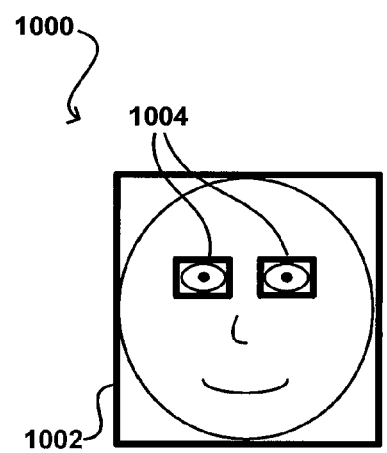
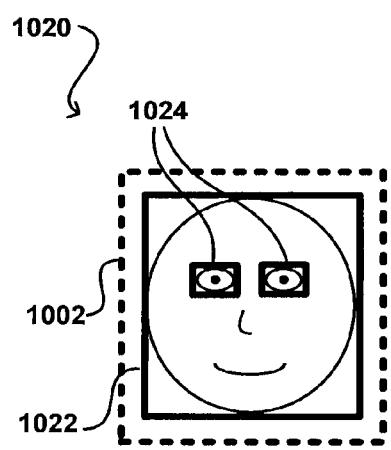
FIG. 10(a)　　　　　　　FIG. 10(b)

us 8,643,703 B1

VIEWER TRACKING IMAGE DISPLAY

BACKGROUND

As the capabilities of various computing devices increase, and as people are utilizing computing devices for an increasing variety of tasks, there are additional challenges being faced in meeting user expectations. For example, an increasing number of applications are providing three-dimensional, virtual reality, or enhanced reality experiences. In one example, it can be desirable to overlay various types of information over an image being captured and/or displayed on a computing or electronic device. If the device is a portable device, the user's hand might jitter which can cause the image being displayed to move with respect to the user, which can take away from the virtual experience. Further, if the user changes position or rotates the device, the display of the device will not adjust accordingly, such that the realistic nature of the display can be significantly degraded.

BRIEF DESCRIPTION OF THE DRAWINGS

Various embodiments in accordance with the present disclosure will be described with reference to the drawings, in which:

FIGS. 4(a)-4(d) illustrate example orientations that can be addressed in accordance with various embodiments;

FIGS. 9(a)-9(f) illustrate example approaches to determining head position and/or gaze direction that can be used in accordance with various embodiments;

FIGS. 10(a)-10(b) illustrate example approaches to determining changes in the relative distance to a user in accordance with various embodiments.

DETAILED DESCRIPTION

Figure 1:
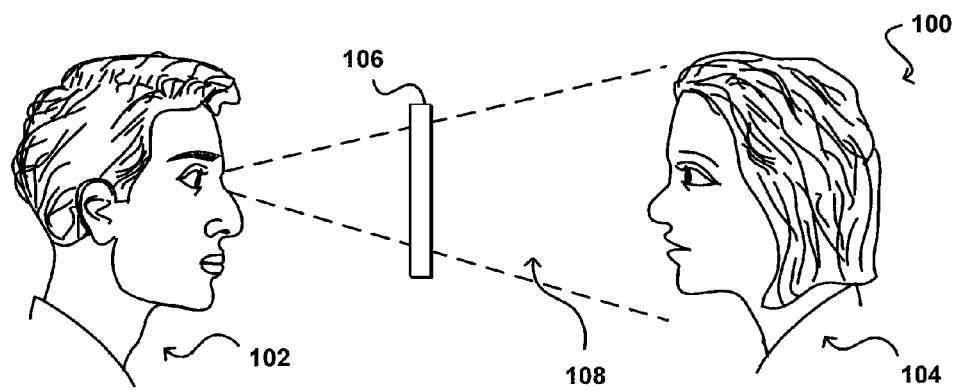
FIG. 1 illustrates an environment in which a user is able to glance at an electronic device to view captured image information in accordance with various embodiments.

Systems and methods in accordance with various embodiments of the present disclosure may overcome one or more of the aforementioned and other deficiencies experienced in conventional approaches to displaying content on an electronic device. In particular, various embodiments enable adjustments to be made to displayed image (i.e., still or video) content based at least in part upon a current relative position of a viewer with respect to the device.

In various embodiments, an image stabilization algorithm provides stability of a captured video image so the image is stable not with respect to a display element, as in conventional approaches, but with respect to the viewer. While many image stabilization algorithms for applications such as digital video cameras attempt to remove jitter from the captured image so that an object centered in the field of view remains centered in the image, algorithms discussed herein instead attempt to have that item remain in substantially the same location relative to the position of the viewer. If the device is displaying image information captured from the other side of the device, for example, the device can act like a virtual piece of glass, wherein the location and/or orientation of an object being viewed by a user will remain substantially unchanged regardless of the relative orientation of the device.

Similarly, a user can change the position of that user's head to view image information from different angles as displayed by the device. For example, a device might have a camera on the back that, by default, points in a direction substantially orthogonal to the primary plane of the device. In many conventional devices, the displayed portion of the captured image depends upon the orientation of the camera, and not upon a relative position of the viewer. In embodiments discussed herein, however, the portion of the captured image that is displayed can depend at least in part upon the relative position of the viewer with respect to the device. For example, if the viewer leans to the right, the displayed image might "pan" to the left such that the device still acts like a pane of glass. The viewer thus is able to change what is displayed by the device at least in part by moving relative to the device.

In some embodiments, the device might not act like a piece of glass, but might instead provide different views based upon the relative position of the user to the device. For example, a user might get a camera view to scroll in one direction by leaning in another. Further, the user might get a three-dimensional image to rotate by changing the user's relative position in a specific direction.

In various embodiments, an electronic device is capable of overlaying information on an image to be displayed. For example, the device might analyze the image and display pertinent information on the image. In other embodiments, the device might enable a user to place graphical elements over specific objects in the image. Various other types of content can be added as well as discussed elsewhere herein. Using the relative position of the user, this additional content can move "with" the associated object in the image, such that the association of the content with the object is not disturbed based on movement of the device and/or viewer.

The image information displayed can be information captured by at least one imaging element of the same electronic device or a different device. Further, the image information can be information rendered by the same or a different electronic device, such as may be part of a media presentation or video game.

In at least some embodiments, at least two cameras are used to detect the relative position of the viewer and/or capture the image information to be displayed. Using two cameras to capture either type of information enables a three-dimensional determination of relative position to be made. In at least some embodiments, a three-dimensional model can be generated to assist in determining the proper image view, portion, and/or perspective to display. Orientation-determining elements such as accelerometers or gyroscopes also can be used to assist in determining changes in the relative orientation of the user.

In various embodiments, an image manipulation algorithm also can be utilized to stretch, compress, rotate, or otherwise manipulate the image such that the image appears of a consistent perspective to the user, such as may exhibit a normal aspect ratio, regardless of the relative position of the user. For example, a viewer looking at a person "through" the device can rotate the device without the apparent perspective or aspect ratio of that other person changing, from the point of view of the viewer.

The relative position of specific features of a viewer can also be tracked by the device. For example, a device can monitor the current location of at least one specified feature of the viewer, such as the viewer's eyes or mouth, and can adjust the determined relative location accordingly. Thus, if the viewer moves or the device is moved such that the relative position between the viewer and the device is altered, the device can adjust input determination accordingly, such as to account for the new relative position and prevent false input.

In some embodiments, the device might have elements that are capable of moving or rotating to provide directionality. For example, an image capture element might include components such as a moving camera, adjustable mirror or lens, rotating gimbal, or other such element to increase the field of view and/or enable image data to be captured from a specific direction and/or distance. Any other data input or output that can be adjusted based upon a current relative position of a user.

Various other applications, processes and uses are presented below with respect to the various embodiments.

FIG. 1 illustrates an example situation 100 wherein two persons 102, 104 are engaging in a conversation, such as may be part of a business meeting or social outing. The first person 102 is viewing the second person 104 using an electronic device 106. The device 106 in this example has at least one camera on the side facing each person 102, 104, and a display element (not shown) on at least the side facing the first person 102. For purposes of simplicity of explanation the first person 102 in this example will be referred to as the viewer, and the second person 104 will be referred to as the speaker. When viewing the speaker 104 using the device, there will be an effective field of view 108 through which the viewer can see the speaker 104. This effective field of view can correspond to at least a portion of a field of view of at least one camera on the side of the device 106 facing the speaker 104.

The viewer 102 might want to view the speaker 104 using the device for any of a number of different reasons. For example, the viewer 102 might be in a room with several different people, and might want to have information such as the name or title of each person pop up on the screen when an image of that person is being captured and displayed by the device. In other cases, such as for gaming or other such applications, it might be desirable to provide one or more graphical images on top of the image of another person.

Figure 2A:
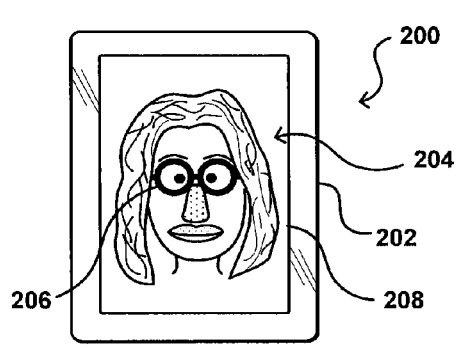
FIGS. 2(a), 2(b), and 2(c) illustrate example displays that can be generated in accordance with various embodiments.

For example, in the situation 200 of FIG. 2(a), the speaker 204 is displayed using a display screen 208 of an electronic device 202. As part of a game, one or more graphical elements 206 are placed on top of the image of the speaker 204. This could be, for example, for a person in the game to appear as a particular character in the game. In this example, the location of the speaker 204 in the image is determined, and graphical elements 206 representing a cheap plastic disguise are positioned in the image to appear as if the speaker is wearing that disguise. Approaches for determining the location of a person in an image and for overlaying graphical elements on an image are well known in the art and will not be discussed in detail herein.

As discussed, it can be desirable in at least certain embodiments to enhance the realism of such a situation as much as possible. For example, if the user moves the device and the added graphics are simply centered relative to the captured image, the changing position of those graphics relative to the displayed face will take the viewer out of the experience, as it will be apparent that the other person is not actually wearing that disguise. Further, if the image of the speaker changes position or view as the location or orientation of the phone is adjusted, it will not appear to the user as if there is an actual person across from that viewer wearing the disguise (i.e., the device will not act as a window through which the viewer is looking).

It would thus be desirable, in at least some embodiments, to adjust the displayed image of the speaker 204 such that the view of that speaker, from the perspective of the viewer, does not substantially change as the device is rotated or translated. For example, in the situation 210 of FIG. 2(b) the user has tilted the device along at least one axis. As can be seen, however, it still appears as if the view of the speaker 204 has not changed. The displayed image thus can appear to the user as if the device is a piece of glass, as the displayed image appears consistent to the viewer (not including changes due to differences in viewable area of the display, translations of the device, etc.). In at least some embodiments, a user can rotate, tilt, translate, or otherwise reorient the device in any direction over at least a minimum range of movement, and at least the position and/or perspective of the displayed image will remain substantially consistent from the point of view of the viewer.

As discussed, such ability can provide a type of image stabilization. Using conventional image stabilization approaches, the image as in FIG. 2(a) would remain virtually unchanged on the display screen. A purpose of conventional image stabilization approaches is to account for small translations or movements of the device capturing the image, such that the image appears on the screen as if the device has not moved and the displayed image does not change. Image stabilization algorithms as discussed herein, on the other hand, attempt to stabilize the image to account (primarily) for movement of the user. If the user does not move, the image seen from the point of view of the user should appear the same, regardless of movement of the device. Movement of the device would in general change the image actually displayed on the device, as the image would be distorted to compensate for the movement in order to enable the view from the user's perspective to remain substantially unchanged. Thus, conventional algorithms attempt to keep the image displayed on the screen consistent, while certain algorithms discussed herein will change the image displayed on the screen in order to keep the view from the user's perspective consistent.

Figure 2B:
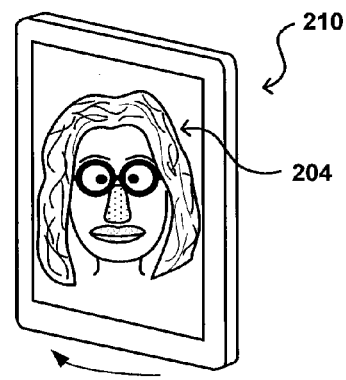
Figure 2C:
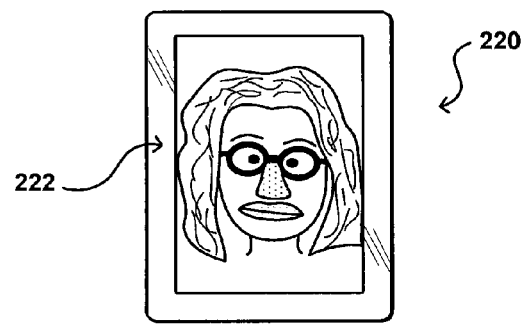

In order for aspects of the image to appear consistent to the user, the actual image displayed by the device in at least some embodiments is modified to compensate for any relative changes in position and/or orientation between the viewer and the device. For example, in the situation 220 of FIG. 2(c) it can be seen that the image of the speaker 222 has been stretched along a specific direction. In FIG. 2(b), the device has been rotated such that the viewable area (from the perspective of the viewer) of the display element decreased, but the width of the speaker did not decrease. In order to provide such appearance, the device (or a system or service in communication therewith) must modify the image based on at least the original image and the current viewing angle of the viewer. In this example, the image of the speaker is stretched horizontally to substantially fill the screen width, such that when viewed at an angle as in FIG. 2(b) the image appears substantially unchanged from before the rotation.

Figure 3A:
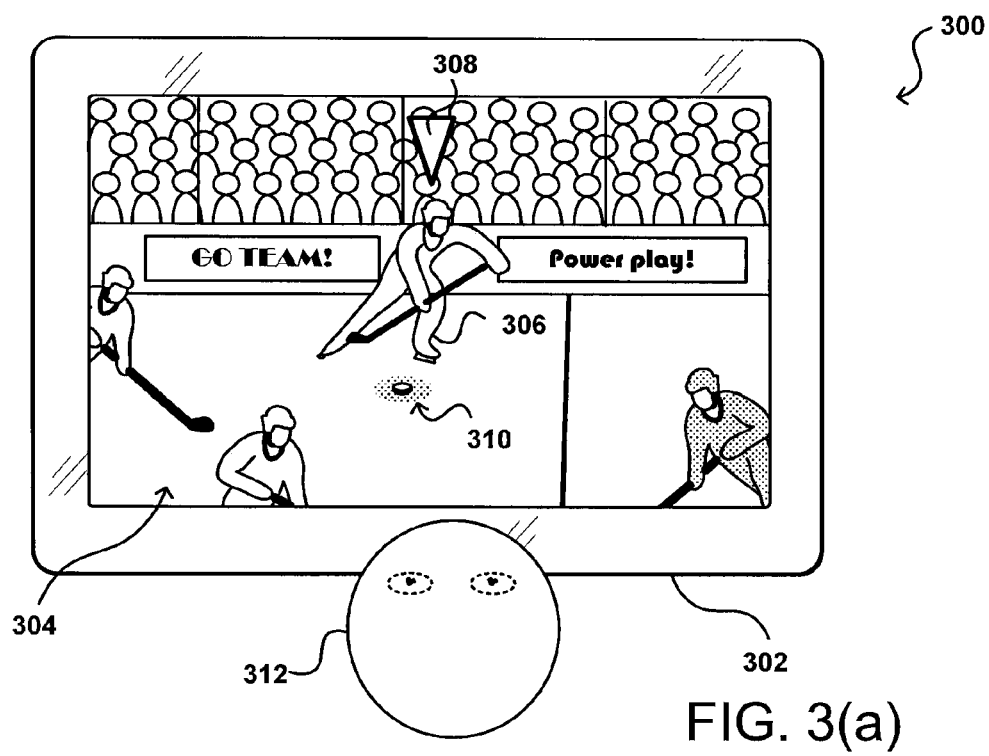
FIGS. 3(a)-3(b) illustrate example displays that can be generated in accordance with various embodiments.

In another example as illustrated in the situation 300 of FIG. 3(a), the device 302 may not move or change orientation significantly or at all (although such movements are possible), and the primary change in relative orientation might be based primarily upon movement of the viewer. For example, in FIG. 3(a) the viewer 312 is viewing a hockey game through an electronic device 302. The viewer and device might actually be at the hockey rink, or might be viewing a controllable (or other such) feed from the hockey rink. If the viewer is not at the rink, the user can have the ability to obtain different views of the rink through motions of the user. An advantage to viewing the hockey game through the device even if the user is at the rink, however, can be the ability of the device to place information over the view of the game. For example, as illustrated in the figure the game displayed 304 can have several different elements. The viewer 312 might want to easily keep track of that viewer's favorite player 306 by having the device display a marker 308 or other such indicator relative to that player. Similarly, in order to more easily be able to determine the current location of the puck, the device might render some type of indicator 310 relative to the puck such that the viewer can quickly determine its location.

Figure 3B:
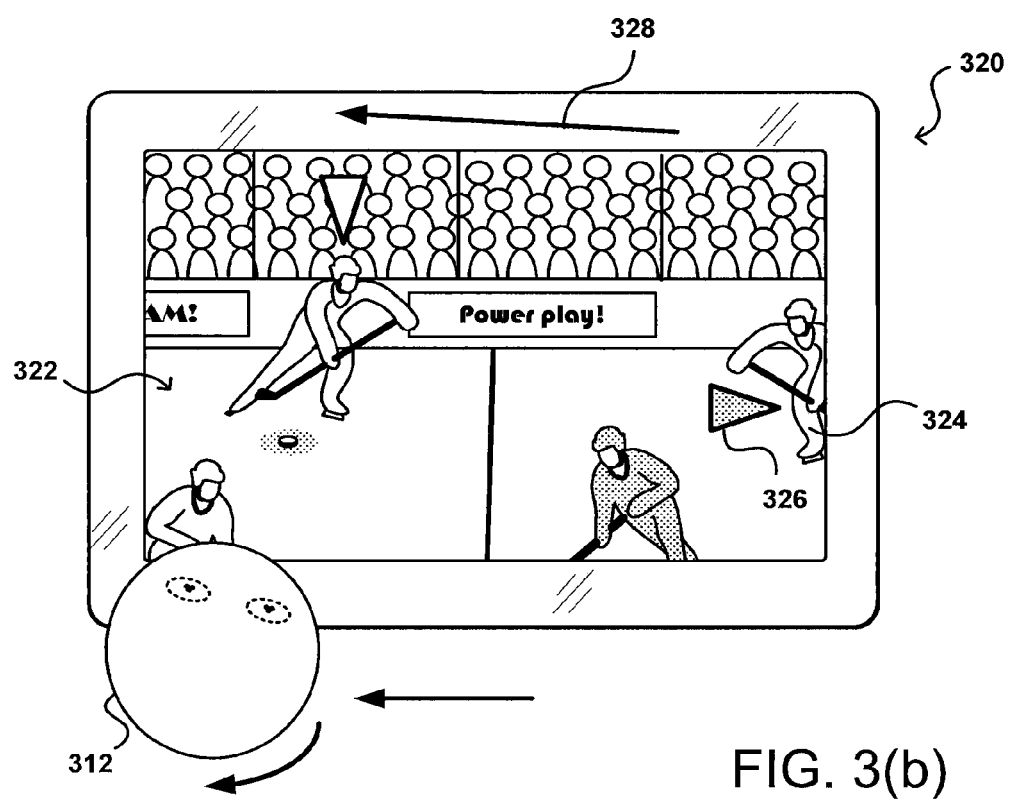

During the game, the viewer 312 might want to view a different portion of the rink. For example, in FIG. 3(a) player 306 has the puck, but the viewer cannot determine from the current view whether anyone is open to receive a pass. In at least some embodiments, the viewer 312 can shift position to the left relative to the device, as illustrated in FIG. 3(b). If the display of the device is still acting like a virtual glass window onto the game, the view and/or image displayed can be adjusted based on the new relative position of the viewer 312.

In the situation 320 of FIG. 3(b), the viewer 312 moving to the left effectively causes the image to shift left 328, or the device to "pan" the view 322 to the right, as if the viewer was viewing the game through an actual window. In this view, an open player 324 can be seen to whom the puck can be passed. In at least some embodiments, another graphical indicator 326 can be added to indicate that the player is on the same team, open, able to receive the puck, etc.

In some embodiments, the amount of a scene being displayed can vary based at least in part upon how closely the user is positioned relative to the screen. The user can change the amount of scene displayed by, for example, pulling the device closer or backing away from the device. In at least some embodiments, the device can magnify or shrink the displayed image to show, for example, more detail or a larger field of view.

For situations such as that in FIGS. 3(a) and 3(b), there may be little image manipulation (e.g., stretching or otherwise deforming) needed due to the distance to the object being viewed relative to the distance of the viewer, although for other situations at least some such manipulation may be necessary. There will be a need, however, to at least change the view displayed by the device. As discussed elsewhere herein, this change in view can be accomplished in any number of ways, such as by using a moving camera, displaying only a portion of the view of a camera with a wide angle lens, stitching together images from multiple cameras, etc.

It should be understood that the ability to pan to different portions of the game in FIG. 3(b) could also be performed by reorienting the device instead of the user. For example, the viewer could translate and reorient the device such that the device is pointing towards the open player, etc. Although this might appear at first glance to utilize a different process than was used for the head movement-based adjustment, or the image stabilization of FIG. 2(b), a single algorithm or process can in fact be used for all these examples.

Consider the example situation 400 of FIGS. 4(a)-4(d). In FIG. 4(a), a viewer 402 is positioned relative to an electronic device 404 such that a primary viewing direction 406 is substantially orthogonal to the device. The relative location of the user can be determined using at least one front-facing camera 410 or other imaging element of the device, using any appropriate process as discussed or suggested herein. The primary viewing direction can be determined using any appropriate algorithm able to determine the direction based at least in part upon a determined relative position of the user and a position on the device, such as a center point of a display element. As discussed later herein, more precise determinations can be made based upon gaze detection and other such factors. For example, the device can utilize information such as the distance to the viewer 402, the relative offset of an imaging element 412 capturing the information, and the field of view 408 of that imaging element 412 to determine an effective viewing angle (as discussed with respect to FIG. 1) of the view through the device.

In FIG. 4(b), the device 406 has been rotated such that the viewing angle 408 of the camera has changed with respect to the viewer 402. The primary viewing direction 406 of the viewer, however, has not substantially changed. In order to provide consistency of the image from the user's point of view, the device has to compensate for the adjustment between the primary viewing direction 406 and the viewing angle 408 of the imaging element. As discussed elsewhere herein, this adjustment can include, for example, changing the direction of the camera, selecting a different portion of the field of view, stretching or compressing the image to compensate for a change in relative orientation, etc.

In the situation of FIG. 4(c), the viewer 402 has instead shifted position relative to the device 404. Although the user would potentially be looking at a different view in the display element, it can be seen that the algorithm essentially handles the movement in the same way, as the relative orientation of all elements in FIG. 4(c) is the same as that in FIG. 4(b), and the algorithm would again determine how to compensate for the change in primary viewing direction 406 with respect to the viewing angle 408 of the imaging element. This can include a change in direction and manipulation of the image, using the same approach as in FIG. 4(b). As discussed, in at least some embodiments the relative distance of the user with respect to the device can also be determined, in order to determine, for example, an amount of detail or zoom level for the displayed image.

A similar approach can be used when a single device is not performing both the imaging and the relative position determinations. For example, the situation of FIG. 4(d) is similar to that of FIG. 4(c), except in this situation there is a separate device 414 capturing the image information to be displayed. Here, the primary device 404 can again determine the relative position of the viewer 402 to that device, and information about the corresponding primary viewing direction 406 can be sent to the secondary device 414 in order to correlate that direction to the viewing angle 408 of the camera of the second device. It should be understood that in other embodiments the image information from the secondary device could instead be sent to the primary device for comparison with the primary viewing direction, or information from both device can be sent to a remote service, etc. In some embodiments, the actions of the secondary device 414 could instead be performed virtually, where no actual image is captured but the image information is rendered from a model, application, etc. As can be seen, the algorithm would handle the information in essentially the same way, and the view to the user would be essentially the same, with the only primary difference being the transmission of information to another location.

Figure 5:
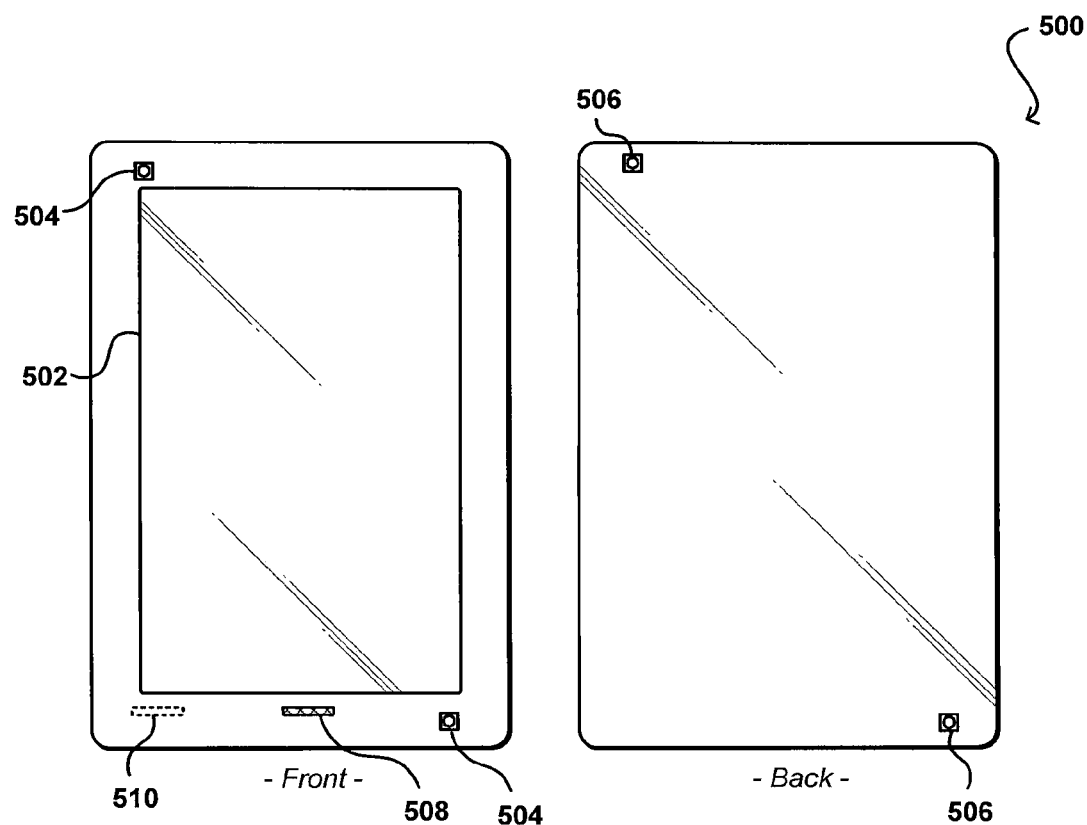
FIG. 5 illustrates front and back views of an example of a computing device that can be used in accordance with various embodiments.

FIG. 5 illustrates front and back views of an example computing device 500 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502, which under normal operation will display information to a user (or viewer) facing the display screen (e.g., on the same side of the computing device as the display screen). The computing device in this example can include one or more image capture elements, in this example including two image capture elements 504 on the front of the device and two image capture elements 506 on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element 508 capable of capturing audio data, and one or more orientation-determining elements 510, such as an accelerometer, gyroscope, digital compass, or inertial sensory, that can assist with movement and/or orientation determinations.

Figure 6:
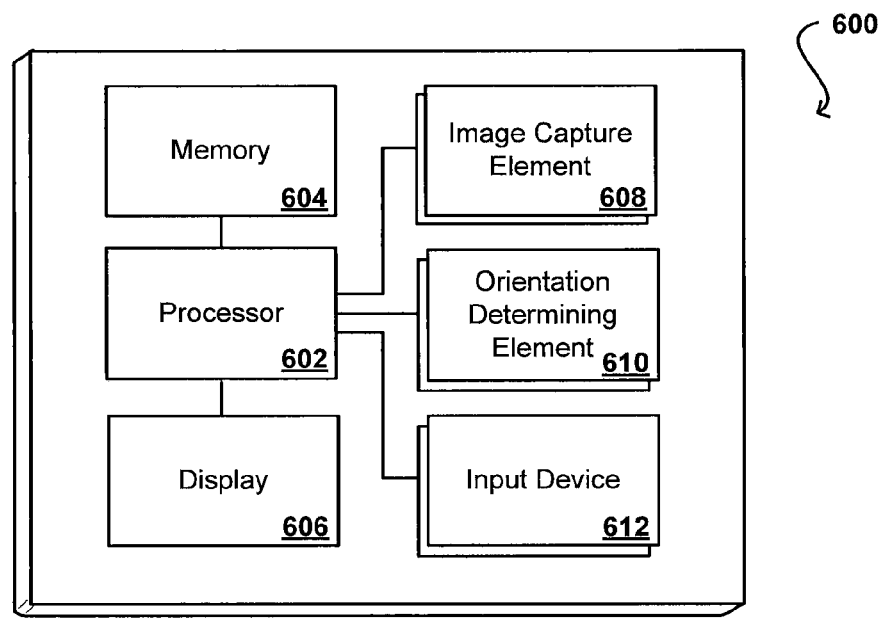
FIG. 6 illustrates example components of a computing device such as that illustrated in FIG. 5.

FIG. 6 illustrates a set of basic components of a computing device 600 such as the device 500 described with respect to FIG. 5. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the processor 602, the same or separate storage can be used for images or data, a removable memory can be available for sharing information with other devices, and any number of communication approaches can be available for sharing with other devices. The device typically will include at least one type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least two image capture elements 608, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one orientation determining element 610, such as an accelerometer, digital compass, electronic gyroscope, or inertial sensor, which can assist in determining movement or other changes in orientation of the device. The device can include at least one additional input device 612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 7:
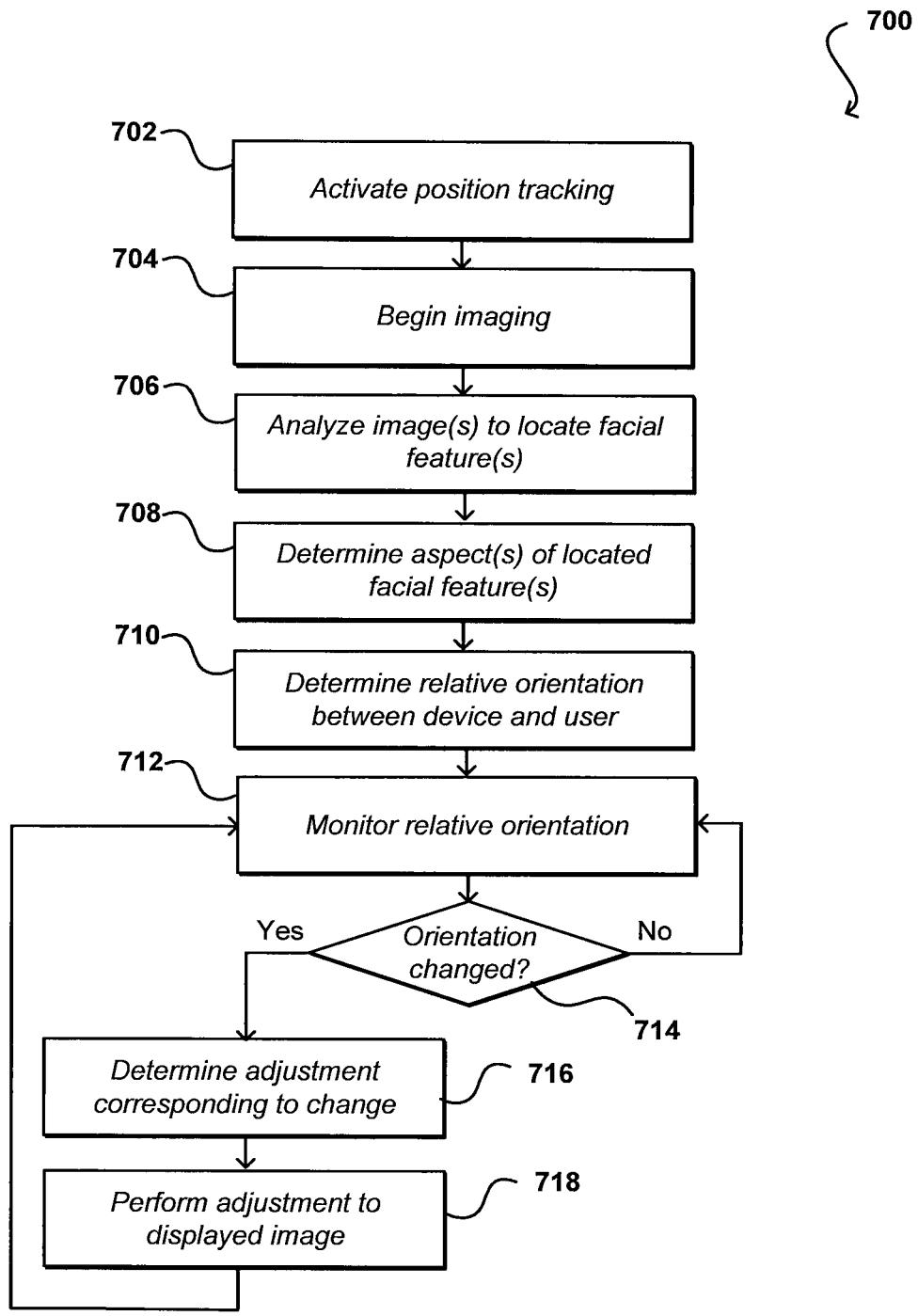
FIG. 7 illustrates an example process for determining relative position that can be used in accordance with various embodiments.

FIG. 7 illustrates an example of a first portion 700 of a process for providing a relative orientation-based image display in accordance with various embodiments. It should be understood that, for any process discussed herein, there can be additional, fewer, or alternative steps performed in similar or alternative orders, or in parallel, within the scope of the various embodiments unless otherwise stated. In this example, position tracking of a viewer is activated on the device 702. In some embodiments a user must activate this mode manually, while in other modes the device can activate the mode automatically when a person is detected nearby. Other modes of activation are possible as well, such as upon a user opening a specific application on the device. When the position tracking is active, the device can begin imaging around the device 704, whether in all directions, some directions, a specific range of directions, or a direction substantially toward a determined viewer. As discussed elsewhere herein, in some embodiments the imaging will involve ambient light image or video capture, while other embodiments can utilize infrared imaging, heat signature detection, or any other such approach. The device can analyze the captured image information to attempt to locate facial features of a user 706, or at least a person nearby, where those features in some embodiments include at least the eyes of a user. In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the facial features are located, the device can attempt to determine aspects or information relating to those features 708. In this example, the determined aspects can be used to attempt to determine a relative orientation between the device and the user, as well as the orientation of those features relative to the device 710, which can be useful in determining information such as the present viewing location of a user. The determined aspects then can be monitored over time 712, such as by continuing to capture and analyze image information to determine the relative position of the user and/or orientation of the device. A change in the aspect, such as a change in position or orientation, can be determined 714, and the device can determine whether that change requires an adjustment to the image to be displayed 716. For example, a rotating the device or shifting position might require the displayed image to be shifted or manipulated to maintain consistency from the point of view of the viewer. If the orientation change is sufficient to warrant an adjustment, the device can determine and perform the appropriate adjustment to the image information 718, such as to stretch, compress, pan, or rotate the image.

Figure 8:
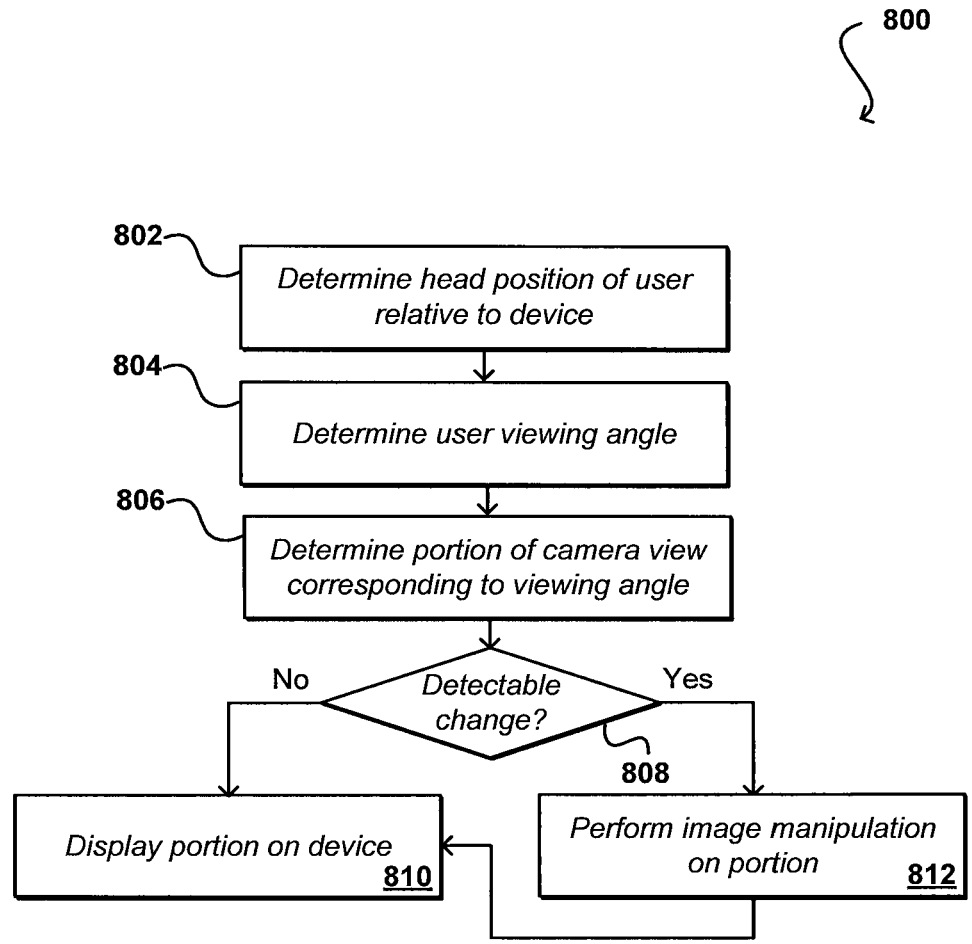
FIG. 8 illustrates an example process for managing the display of content in response to relative position that can be used in accordance with various embodiments.

As an example of such adjustment, FIG. 8 illustrates a second portion 800 of a process for modifying the image in response to a determined change in orientation that can be used in accordance with various embodiments. In this example, aspects of the image and any other information displayed can be based at least in part upon the relative position of a viewer, although various other approaches could be used as well as discussed elsewhere herein. During operation, an electronic device can determine (and monitor over time) the relative position a viewer 802. Based at least in part upon the relative position, a primary viewing direction or viewing angle of the viewer can be determined 804, the device can determine the appropriate portion of the camera view that corresponds to that angle 806. As discussed, the camera view might require translating the camera, capturing image information from a different camera, or selecting a different portion of a larger image captured by the camera.

The primary viewing direction and relevant portion of the camera view then can be compared to the currently and/or previously displayed image to determine whether any movement or change in relative orientation has occurred that would result in a detectable change in the image from the perspective of the viewer 808. If so, the image information can be manipulated (e.g., stretched, compressed, translated, etc.) to maintain consistency of view as discussed elsewhere herein 810. After any necessary manipulation has been made, the relevant portion of the image information from the appropriate viewing direction can be displayed on the device 812.

Various approaches can be utilized for locating one or more desired features of a user's face to determine various aspects useful for determining relative orientation. For example, an image can be analyzed to determine the approximate location and size of a user's head or face. FIG. 9(*a*) illustrates an example wherein the approximate position and area of a user's head or face 900 is determined and a virtual "box" 902 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 904 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Various other algorithms can be used to determine the location of features on a user's face. For example, FIG. 9(*b*) illustrates an example wherein various features on a user's face are identified and assigned a point location 906 in the image. The system thus can detect various aspects of user features and can determine more subtle changes in orientation. Such an approach provides advantages over the general approach of FIG. 9(*a*) in certain situations, as various other features can be determined, in case the user's eyes cannot be seen due to glasses, hair, etc.

Once the positions of facial features of a user are identified, relative motion between the user and the device can be detected and utilized as input. For example, FIG. 9(*c*) illustrates an example where the user's head 900 is moving up and down with respect to the viewable area of the imaging element. As discussed, this could be the result of the user moving his or her head, or the user moving the device up and down, etc. FIG. 9(*d*) illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 9(*e*) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 9(*f*) illustrates another advantage of using an approach such as that described with respect to FIG. 9(*b*) to determine the position of various features on a user's face. In this exaggerated example, it can be seen that the features of a second user's head 1008 have a different relative position and separation. Thus, the device also can not only determine positions of features for a user, but can distinguish between different users.

FIGS. 10(*a*) and 10(*b*) illustrate an example approach that can be used to determine variations in relative distance between a user and a device that can be used in accordance with various embodiments. As in FIG. 9(*a*), the approximate position and area of a user's head or face 1000 is determined and a virtual "box" 1002 is placed around the face at an initial distance as an indication of distance using one of a plurality of image analysis algorithms for making such a determination. If the user is known, the size of the user's head might be stored such that an actual distance to the user can be calculated based at least in part upon the size of the box 1002. If the user is not known, the distance can be estimated or determined using other factors, such as stereoscopic imaging. In some embodiments, determinations will be relative with respect to an initial box size when the actual distance cannot be determined.

As the distance between the user and the device changes, the size of the virtual box will change as well. For example, in FIG. 10(*b*) the distance between the user and the device has increased, such that the user's head 1020 appears smaller in the captured image information. Accordingly, the size of the virtual box 1022 for the adjusted size of the user's head is smaller than the original box 1002 for the initial distance. By monitoring adjustments in the size of the box or another measure of the user's head and/or other such features (e.g., boxes 1024), the device can determine an approximate distance and/or change in distance to the user. As discussed, this information can be used to adjust aspects of the displayed image information such as a level of zoom or amount of detail.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred.

As mentioned, it can be desirable in at least some embodiments to utilize at least two imaging elements (i.e., stereoscopic imaging) to determine the location of the user, as well as to capture image information to be displayed. In almost all situations the position of an imaging element will be offset from the eye of a user, such that some image translation and viewing angle adjustments may need to be made to ensure the consistency of the displayed image. Particularly for applications such as image stabilization from the point of view of the viewer, it can be important to compensate for differences in viewing angle resulting from the camera being offset from the user's eye.

An imaging element capturing image information in at least one embodiment is a relatively high resolution camera that is able to capture image information over a large angular range. The offset of the viewer's eyes to the imaging element can create a parallax effect that will cause the window effect to be less than ideal in many situations. For example, referring back to FIG. 4(a) the viewing angle from the viewer 402 to the end of arrow 406 will be slightly different than the viewing angle from imaging element 412 because there is an offset there between. In order to compensate for the offset such that the view of the world from the camera matches the view of the world by the viewer, a three-dimensional model of the surrounding area can be generated that enables the device to rotate the view as necessary to match the view of the user. Without stereo cameras the device can attempt to minimize the effects of parallax by translating the image or making other manipulations, but there will be some slight differences due to the offset.

A number of different applications can take advantage of various approaches discussed herein in accordance with the various embodiments. For example, an electronic device might be placed on a tripod to record an activity. If a viewer is moving his or her head to see the portion of the activity that is of interest, the device can record that portion of the image that is displayed as a result of orientation changes. Such an approach enables a viewer to record certain portions of the activity, such as that viewer's child in a game. Such an approach also enables information to be added to the image as discussed above.

For example, a viewer in a store might be able to view one or more products through the device and see information (e.g., reviews, description, pricing, etc.) about that product displayed relative to the image of the device. As the viewer changes orientation and different products come into view, the added information can update accordingly. In some embodiments, a viewer can also obtain information about different versions of the product, compatible accessories, or other such information.

In one embodiment, image recognition can be used with the imaging process to identify specific people, objects, or other such things. For example, a viewer might be looking for a person in a crowd. The viewer could look "through" the device while scanning the device across the crowd, and when the desired person is recognized by the device as coming into view the device can generate a notification for the viewer, such as adding graphics or text to the image, making an audible noise, causing the device to vibrate, or performing another such notification action.

As discussed, in various embodiments a device can utilize the viewer's gaze direction as an input as well as the relative position. The usefulness of such information can increase with an increase in the size of the display for at least some applications. For example, if the display is a large screen television display then the user might only be able to focus on a portion of the screen at any time. Thus, the portion at which the viewer is looking can provide certain functionality. For example, the device can record portions of a video that are most of interest to the viewer. For example, if the viewer is watching a child play soccer then the device can record a portion of the overall image that is displayed but that corresponds to the viewer's interest, which will generally be primarily directed towards the child. If the resolution is sufficient, the viewer then can obtain a video file that is "zoomed in" on the portion of interest to that viewer during the time of the recording. If there are instead multiple viewers around the television and only one of the viewers wants additional information such as statistics or other information overlaid, the device can cause the additional information to only be displayed in the portion where the viewer is looking, leaving the rest of the image free of such information.

Figure 11:
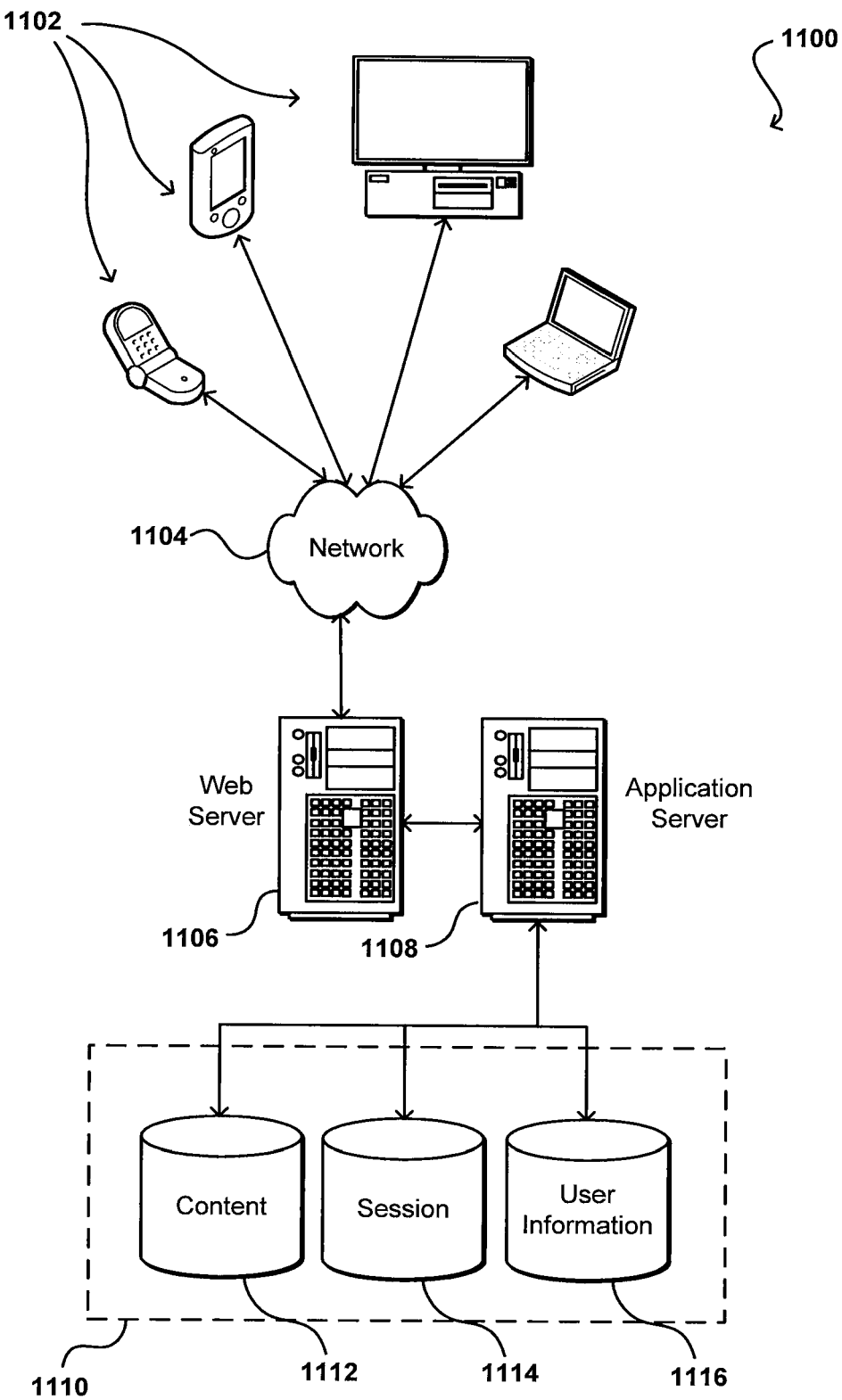
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing position-dependent image display, comprising:
    under control of one or more computing systems configured with executable instructions,
        capturing at least one first image of a viewer of a display element on an electronic device using at least one first imaging element of the electronic device;
        based at least in part upon the at least one first image, determining a relative orientation of the viewer with respect to the electronic device;
        capturing at least one second image using at least one second imaging element of the electronic device, the at least one second image including at least image information from a viewable area of the viewer as obstructed by at least a portion of the electronic device;
        determining a final portion of the at least one second image corresponding to the obstructed region of the viewable area;
        based at least in part upon the relative orientation of the viewer with respect to the electronic device, performing any manipulation of the final portion of the at least one second image such that the final portion is displayed to the viewer with a perspective corresponding substantially to the perspective of the final portion if the electronic device was not obstructing the obstructed region; and
        displaying the final portion after any manipulation to the viewer using a display element of the electronic device,
        wherein the perspective of an image being captured and displayed by the electronic device is substantially maintained from the point of view of the viewer regardless of changes in orientation of the viewer with respect to the electronic device over at least a viewable range of motion.

2. The method of claim 1, wherein the at least one first image of the viewer is captured using at least two imaging elements to determine a three-dimensional relative position of the viewer with respect to the electronic device.

3. The method of claim 1, wherein the at least one second image is captured using at least one two imaging elements to generate a three-dimensional model of at least the viewable area obstructed by at least a portion of the electronic device.

4. The method of claim 1, wherein performing any manipulation of the final portion of the at least one second image includes utilizing the three-dimensional model to offset parallax due to a relative position of the at least one second imaging element with respect to the viewer.

5. The method of claim 1, wherein any adjustment to account for parallax is approximated for two-dimensional data.

6. The method of claim 1, wherein the at least one second imaging element capturing at least one second image is associated with a remote electronic device, the manipulation of the final portion of the at least one second image being such that the final portion is displayed to the viewer with a perspective corresponding substantially to the perspective of the final portion if the remote electronic device was substantially at the position of the electronic device and the remove electronic device was not obstructing the obstructed region.

7. A method of displaying an image on an electronic device, comprising:
    under control of one or more computing systems configured with executable instructions,
        capturing image information of a user of the electronic device;
        determining a relative orientation between at least one feature of the viewer of the electronic device and the electronic device based at least in part upon the captured image information;
        determining a viewable area of an image to be displayed on the electronic device corresponding to the relative orientation of the viewer; and
        performing any manipulation of the viewable area of the image, based at least in part upon the determined relative orientation, to enable at least a portion of the image to maintain substantially the same perspective from the point of view of the viewer, when displayed by the electronic device, regardless of changes in the relative orientation between the viewer of the electronic device over at least a range of changes in relative orientation.

8. The method of claim 7, wherein the changes in relative orientation are capable of being performed through at least one of movement of the viewer or movement of the electronic device.

9. The method of claim 7, wherein the image to be displayed is captured using at least one image capture element of the electronic device or rendered by the electronic device.

10. The method of claim 7, wherein at least a portion of the image further appears in substantially the same position from the point of view of the viewer, when displayed by the electronic device, regardless of changes in a relative position between the viewer of the electronic device over at least a range of changes in relative position.

11. The method of claim 7, further comprising:
    analyzing at least one object in the image to be displayed to determine identifying information about the at least one object.

12. The method of claim 11, further comprising:
    overlaying content on the at least one object when displayed on the electronic device, the content relating to the identifying information.

13. The method of claim 12, wherein the content remains positioned over the at least one object as the position of the object moves in the image displayed on the electronic device.

14. The method of claim 11, wherein an apparent position of the overlaid content is maintained in three-dimensional space from the point of view of the viewer.

15. The method of claim 7, wherein the image displayed on the electronic device is displayed using a three-dimensional display to minimize focusing issues of the human eye.

16. The method of claim 7, further comprising:
determining a gaze direction of the viewer; and
modifying at least a portion of the displayed image based at least in part upon the determined gaze direction.

17. The method of claim 7, wherein determining the relative orientation between the viewer and the electronic device includes using at least two imaging elements to determine a three-dimensional relative position of the viewer with respect to the electronic device.

18. The method of claim 7, wherein determining a relative orientation between a viewer of the electronic device and the electronic device includes capturing image information for the viewer using at least one of thermal imaging, infrared radiation detection, and motion detection.

19. A computing device, comprising:
a processor;
a display element;
at least two image capture elements; and
a memory device including instructions operable to be executed by the processor to perform a set of actions, enabling the computing device to:
determine a relative orientation between a viewer of the computing device and the computing device using at least one of the image capture elements;
determine a viewable area of an image to be displayed on the display element corresponding to the relative orientation of the viewer;
perform any manipulation of the viewable area of the image, based at least in part upon the determined relative orientation, to enable at least a portion of the image to maintain substantially the same perspective from the point of view of the viewer, when displayed by the electronic device, regardless of changes in the relative orientation between the viewer of the electronic device over at least a range of changes in relative orientation.

20. The computing device of claim 19, wherein the changes in relative orientation are capable of being performed through at least one of movement of the viewer or movement of the computing device.

21. The computing device of claim 19, wherein the relative orientation between the viewer and the electronic device is determined at least in part by capturing at least one image of the viewer using at least one of the image capture elements of the electronic device and analyzing the at least one image to determine the relative orientation.

22. The computing device of claim 19, wherein at least a portion of the image further appears in substantially the same position from the point of view of the viewer, when displayed by the computing device, regardless of changes in a relative position between the viewer of the computing device over at least a range of changes in relative position.

23. The computing device of claim 19, wherein the image to be displayed is captured using at least two of the image capture elements, and wherein the instructions further enable the computing device to generate a three-dimensional model of the image to be used in performing any manipulation of the image based on the relative position of the viewer.

24. A non-transitory computer-readable storage medium storing processor-executable instructions for controlling a computing device, comprising:
program code for determining a relative orientation between a viewer of the computing device and the computing device using at least one of the image capture elements;
program code for determining a viewable area of an image to be displayed on the display element corresponding to the relative orientation of the viewer;
program code for performing any manipulation of the viewable area of the image, based at least in part upon the determined relative orientation, to enable at least a portion of the image to maintain substantially the same perspective from the point of view of the viewer, when displayed by the electronic device, regardless of changes in the relative orientation between the viewer of the electronic device over at least a range of changes in relative orientation.

25. The non-transitory computer-readable storage medium of claim 24, wherein the changes in relative orientation are capable of being performed through at least one of movement of the viewer or movement of the computing device.

26. The non-transitory computer-readable storage medium of claim 24, wherein the relative orientation between the viewer and the electronic device is determined at least in part by capturing at least one image of the viewer using at least one of the image capture elements of the electronic device and analyzing the at least one image to determine the relative orientation.

27. The non-transitory computer-readable storage medium of claim 24, wherein the image to be displayed is captured using at least two of the image capture elements, and wherein the instructions further enable the computing device to generate a three-dimensional model of the image to be used in performing any manipulation of the image based on the relative position of the viewer.

* * * * *